June 25, 1957    E. MULLEN ET AL    2,796,973
LOAD CARRIERS FOR USE IN OVERHEAD TROLLEY CONVEYOR SYSTEMS
Original Filed May 17, 1947    2 Sheets-Sheet 2
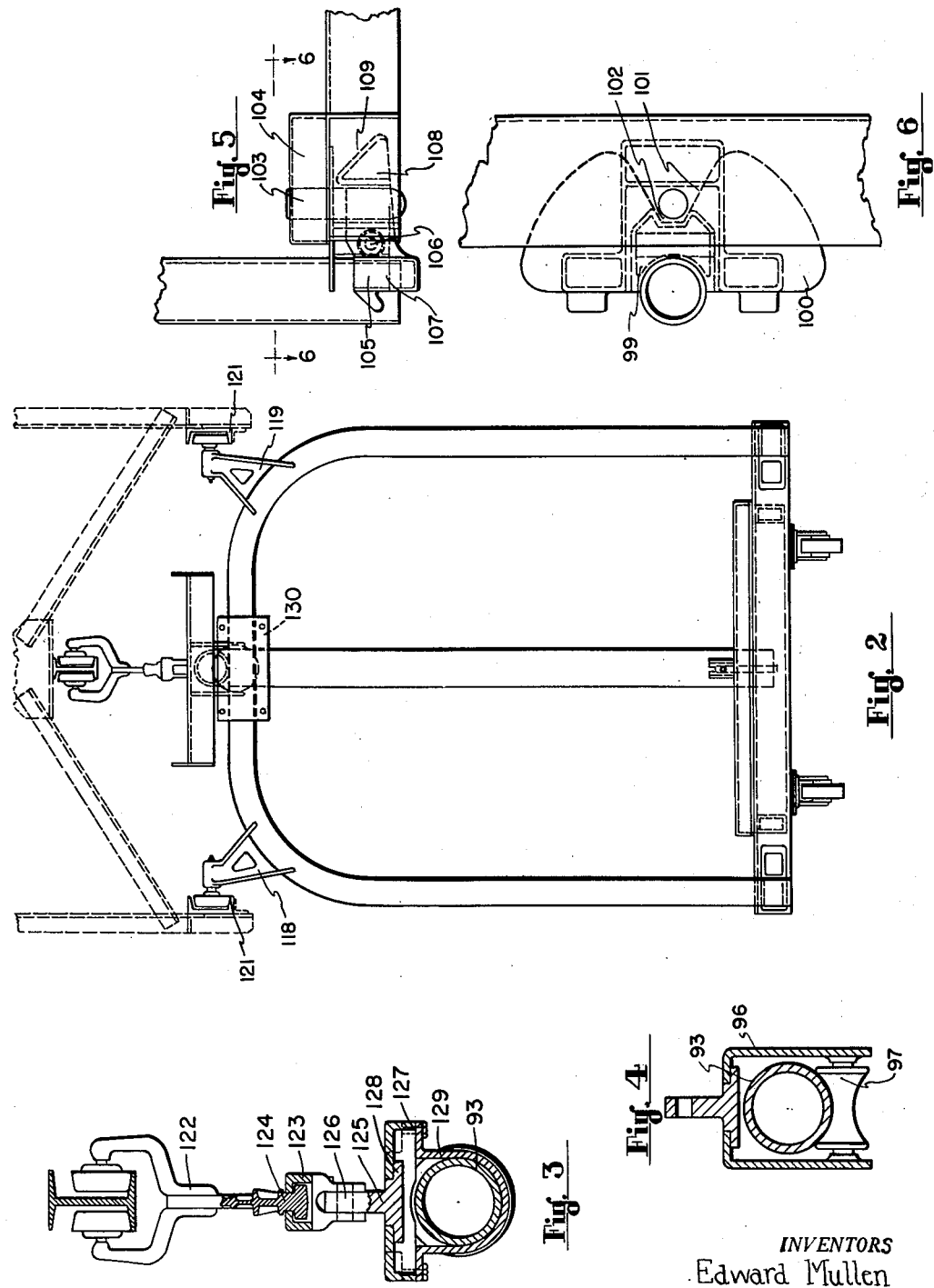
INVENTORS
Edward Mullen
Ross Harris
BY Joseph Darley
ATTORNEY

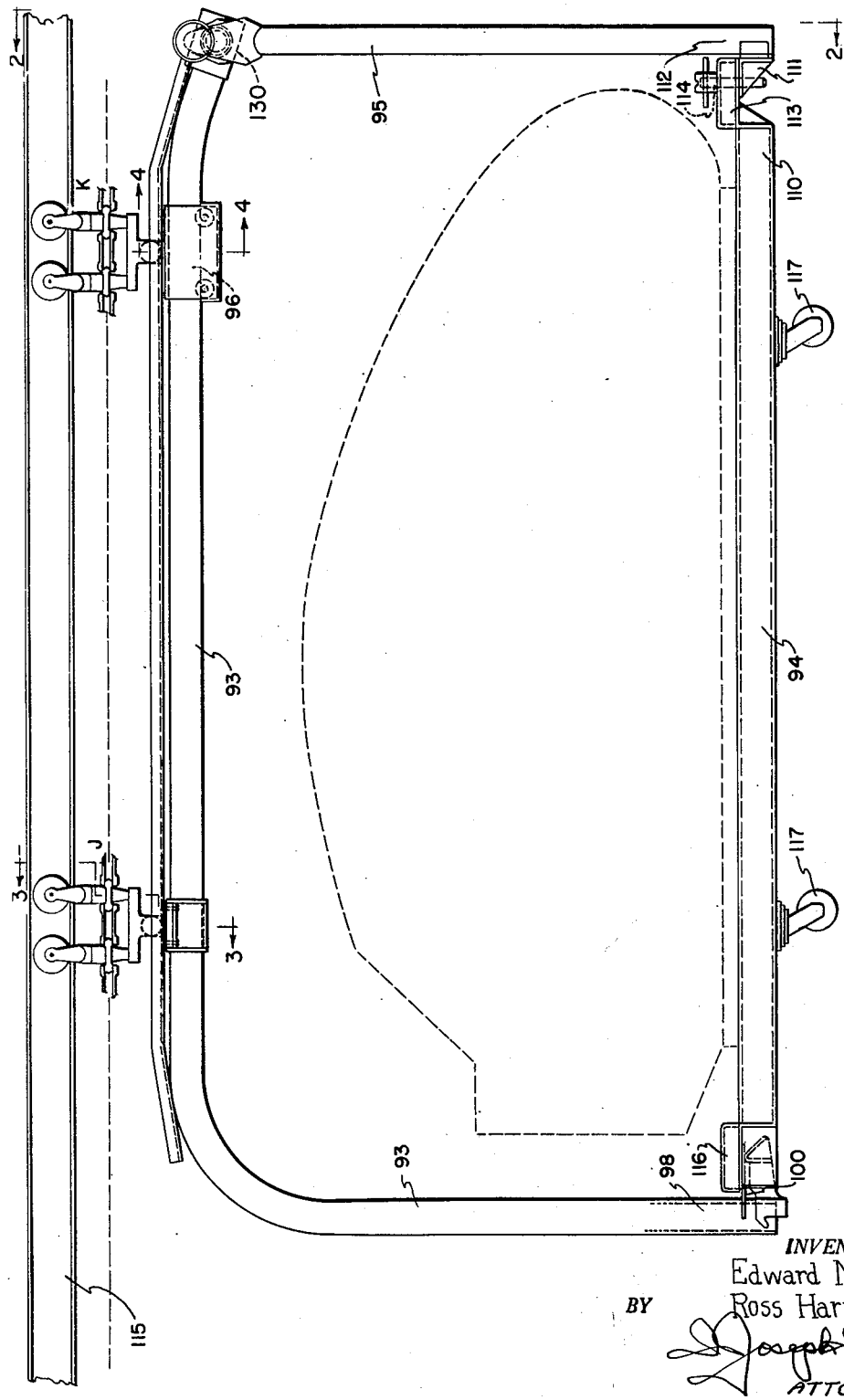

United States Patent Office 2,796,973
Patented June 25, 1957

2,796,973

LOAD CARRIERS FOR USE IN OVERHEAD TROLLEY CONVEYOR SYSTEMS

Edward Mullen, Detroit, Mich., and Ross Harris, Branson, Mo., assignors to Mechanical Handling Systems, Inc., Detroit, Mich., a corporation of Michigan Original application May 17, 1947, Serial No. 748,704, now Patent No. 2,664,993, dated January 5, 1954. Divided and this application July 8, 1953, Serial No. 366,783

6 Claims. (Cl. 198—177)

This invention relates to overhead trolley conveyors and more particularly to conveyor fixtures adapted to support a load at points longitudinally spaced along the conveyor track and to be supported by a plurality of trolleys propelled along the conveyor track by a chain drive. This application is a division of parent application Serial No. 748,704, filed on May 17, 1947, and now Patent No. 2,664,993 and is directed to one of the nonelected species originally disclosed therein.

In providing carrying means of this type a number of problems are encountered in making provision for horizontal and vertical curves in the conveyor track especially where each of the trolleys which contribute to the support of a single load is propelled by a common drive chain.

The nature of such problems may be seen by referring to a typical case wherein four longitudinally spaced trolleys are used to support a single rigid load, two adjacent trolleys being adapted to support each end of the load with a plurality of additional trolleys interposed between the two pairs of load supporting trolleys, and all of the trolleys being propelled by a common drive chain. If the relative motion of such trolleys be considered independently of any carrying means or load attached thereto, the various types of movement which must be provided for in such carrying means becomes apparent.

Taking first the case of a horizontal curve in the track, as the first of the load supporting trolleys enters such curve, it is necessary that such trolley pivot about a vertical axis relative to the following trolleys. As the first trolley rounds a curve the drive chain suspended between the first two trolleys will form a chord cutting across the arc of the curve. Such chord line will be defined by the rear pivotal point in the chain link which is attached to the first trolley bracket and the forward pivotal point in the chain link attached to the second trolley bracket. Since such pivotal points in the respective chain links are usually longitudinally spaced from the vertical axis of the trolley brackets in question, a second chord line lying outside of the line of the chain intermediate the first two trolley brackets will be defined by the vertical axes of the trolley brackets. The length of such second chord line will be somewhat shorter than the distance between the same trolleys' axes on the straight section of track before entering the curve due to the fact that as soon as the first trolley enters the curve, the chain between the first two trolleys assumes a position other than its most extended position. Therefore, if a carrying fixture supported by the first two trolleys were such as to define a fixed distance between the trolleys, the first trolley would not be free to follow the path of the curve but would tend to be held in a straight position by the tension developed in the drive chain.

Thus, it will be seen that any rigid carrying fixture suspended from the first two trolleys should include provision for permitting each of the trolleys to move closer to each other in rounding a horizontal curve as well as to permit each trolley to pivot about its vertical axis independent of the other trolleys and independent of the position of the fixture between the first two trolleys.

As the trolleys continue around the curve, it will be seen that a series of short chord lines will be formed by the chain extending between adjacent trolley brackets and that a major chord line will be defined by the forward and rear end of a load suspended from a point between the first two load carrying trolleys and at a second point between the last two load carrying trolleys.

Since the drive chain attached to each of the trolley brackets follows more closely the curved path of the conveyor track than the major chord line described above, it is apparent that the suspension connections at one end must be free to move closer to the suspension connections at the other end while the load is rounding a curve in the track by an amount equal to the difference in length between that of the major chord line mentioned and the length of the chain between the points establishing such chord line. It is also apparent that during the rounding of such curve, the major chord line will extend in a horizontal direction both different from the line joining the first two load supporting trolley brackets and that joining the last two load supporting trolley brackets. Thus, if any rigid form of member is used to divide the load between the first two or the last two load supporting brackets, provision must be made for the pivotal movement of such rigid member about a vertical axis relative to the fixture members which more directly support the load.

In the case of vertical curves, similar problems are encountered with respect to changes in the relative distances between the forward and rear end supporting points as compared to the length of chain between such points. In addition, in order that the individual bracket members may be free to assume a position normal to the surface of the track throughout such vertical curve, it becomes necessary to provide in the attachment to the load carrying means a connection which permits pivotal movement of the individual brackets about a transverse axis relative to the other brackets as well as to the load carrying means.

Furthermore, unless the load is to be permitted to swing freely in a longitudinal path relative to the load supporting brackets, a rigid form of carrying means must be provided which will maintain one end of the load in a substantially fixed position relative to a load supporting bracket member associated with such end. To permit the swinging movement mentioned may be objectionable for a number of reasons including possible danger and damage incident thereto, inconvenience where it is desired to perform certain operations on the load as it is being carried, as well as additional space which would be required between adjacent loads to prevent one load from swinging into another as it started up or down a vertical curve.

On the other hand, it will be recognized that the provision of a rigid structure for preventing such a swinging motion augments the difficulty in providing necessary freedom for the movements discussed above.

The embodiment disclosed herein incorporates the necessary freedom of movement discussed above while providing a fixed longitudinal position for the load relative to at least one of the supporting trolleys.

In general, it is the object of the present invention to provide a carrying fixture adapted to support an elongated rigid load, such as an automobile body or chassis, from two longitudinally spaced points under an overhead conveyor track, and to be supported by a plurality of trolleys each of which is propelled along the conveyor track by a common drive chain.

More specifically, it is an object of the present invention to provide carrying means of this general type which will permit—

(a) The pivotal movement of each load supporting trolley bracket about a vertical axis independent of the other trolley brackets and of the load and load carrying fixture; and (b) The pivotal movement of each load supporting trolley bracket in a vertical plane passing through the conveyor track relative to the other trolley brackets, load and load carrying fixture.

Another object is to provide carrying means incorporating provision for the relative movements outlined above which is simple, economical of construction and dependable.

These and other objects will appear more clearly from a detailed description of a particular embodiment of our invention and by reference to the drawings forming a part hereof and wherein:

Fig. 1 is a side elevation showing the general arrangement of the carrying fixture adapted to convey a wheeled load carrying pallet along an overhead conveyor track.

Fig. 2 is an end elevation of the carrying assembly taken along the line 2—2 of Fig. 1.

Fig. 3 is an enlarged sectional view taken along the line 3—3 of Fig. 1.

Fig. 4 is an enlarged sectional view taken along the line 4—4 of Fig. 1.

Fig. 5 is an enlarged fragmentary view of the coupling shown at the lower left-hand corner of Fig. 1.

Fig. 6 is a plan view of the coupling taken along the line 6—6 of Fig. 5.

Referring to Figs. 1 through 6, a load carrying fixture is shown which is adapted to convey loads supported on wheeled pallets for convenient movement of the loads along the floor of a plant while they are not being transported by the overhead conveyor system. This fixture incorporates the use of round pipe as the major components of the framework including a single pipe member 93 extending over the complete length of the load and curved downward at the forward end 93a where it extends to the level of the load supporting pallet 94. Pivotally connected at 130 to the rear end of the pipe 93 an inverted U-shaped pipe member 95 is provided which extends downwardly to the level of the rear end of the pallet 94.

Forward and rear trolley assemblies J and K are provided, the forward assembly J fixing the longitudinal position of the carrying fixture while the rear trolley assembly K is free to move longitudinally relative to such fixture. As shown in Fig. 4, the hanger 96 in the rear trolley assembly K is provided with concave rollers 97 adapted to roll along the curved surface of the pipe 93. Rigidly secured at the lower forward end 98 of the pipe 93, as most clearly shown in Figs. 5 and 6, is a load supporting assembly comprising a bracket member 99 welded to the pipe 98 which, in turn, supports the horizontal plate 100. A deep tapered notch 101 is provided in the plate 100 and the bracket member 99 is likewise provided with a recess 102 which together serve to guide and accommodate the locking pin 103 provided in the forward end 104 of the load supporting pallet assembly. A locking member 105 is pivotally attached to the bracket 99 as indicated at 106. This member is weighted at the forward end 107 in order to normally retain the rearward end 108 in an upward position. When the pallet 94 is being loaded onto the carrying fixture, the guide pin 103 is nosed into contact with the tapered surface 109 of the locking member 105 causing its rearward end 108 to be depressed as the pin 103 moves into the recess 101, 102 whereupon the rearward end 108 returns to its normal position, as shown in Fig. 5, locking the pin 103 in place. The rearward end 110 of the pallet may thereupon be wheeled into alignment with the rear end of the fixture 95 which may then be swung into its supporting position. The bracket member 111 rigidly secured to the lower tubular ends 112 will then assume a supporting position beneath the end 113 of the pallet. Aligned bores provided in the bracket 111 and end 113 accommodate locking pins 114.

It will be realized that the conveyor track 115 at loading points will be positioned at a level relative to the floor level, such as will permit the ends 116, 113 of the pallet to overlie respectively supporting plate 100 and supporting brackets 111 while the wheels 117 of the pallet are in supporting contact with the floor. As the conveyor fixture moves along such level with the pins 103, 114 in their proper position, the pallet 94 will be drawn along the floor, and as the fixture moves to a higher level, the plate 100 and brackets 111 will move into supporting engagement with the ends of the pallets 116, 113, thereupon lifting the pallet and load carried thereon off of the floor.

As shown in Fig. 2, guide trolleys 118, 119, together with auxiliary guide tracks 121 are provided to prevent lateral swinging of the load throughout any desired portion of the conveyor line.

Necessary freedom of movement of the trolley assemblies J and K and of the individual trolleys is accomplished through the pivotal connections shown most clearly in Fig. 3 providing freedom of movement about vertical, transverse, and longitudinal axes. Thus, relative pivotal movement between individual trolleys 122 and spanning element 123 about a vertical axis is provided by a pivotal connection at 124; between the spanning element 123 and the depending swivel element 125 about a transverse axis by a pin connection at 126; between the swivel element 125 and hanger element 127 about a vertical axis by a swivel connection at 128; and between the U-shaped extension 129 of the hanger element 127 and the tubular member 93 about a longitudinal axis by the longitudinally extending semi-cylindrical bearing surface of the U extension 129.

While a satisfactory embodiment incorporating the essential features of this invention has been described in detail, it will be recognized that numerous changes in the detailed construction are possible without departing from the scope of the invention as set forth in the appended claims.

We claim:

1. An overhead conveyor system comprising an overhead conveyor track, longitudinally spaced, chain driven load supporting trolleys adapted to travel along said track, a carrier for rigid longitudinally extending loads suspended from at least two of said trolleys, said carrier having a rigid member extending longitudinally between said supporting trolleys, connecting means fixing the longitudinal position of said member relative to one of said trolleys, connecting means accommodating free relative longitudinal movement between said member and another of said trolleys, each of said connecting means including a vertical axis pivot permitting swivel movement of each trolley relative to said member, said member having an integral depending portion at one end adapted to engage one end of a rigid load, and a depending member swivelly connected along a transverse axis to the other end of said first member, the lower end of said latter depending member being adapted to swing into position for engaging the other end of said rigid load.

2. A rigid load conveying means as set forth in claim 1 wherein said first depending portion extends downwardly to a load engaging point centrally disposed under said conveyor track, and wherein said pivotally connected depending member is in the form of a yoke having load engaging portions extending downwardly to transversely spaced points on either side of the centerline of said conveyor track.

3. An overhead conveyor system comprising an overhead conveyor track, longitudinally spaced, chain driven load supporting trolleys adapted to travel along said track, a load carrier suspended from at least two of said trolleys, said carrier having a rigid member extending longitudinally between said supporting trolleys, connecting means fixing the longitudinal position of said member relative to one of said trolleys, connecting means accommodating free relative longitudinal movement between said member and another of said trolleys, each of said connecting means including a vertical axis pivot permitting swivel movement of each trolley relative to said member, said longitudinally extending member having an integral depending portion extending downwardly to a load engaging level, a depending member connected to the other end of said longitudinally extending member also extending downwardly to a load engaging level, and a wheeled load pallet adapted to be alternately engaged and carried by said depending elements of said carrier or to be deposited at floor level and disengaged from said carrier for independent movement along the floor.

4. Conveying means as set forth in claim 3 wherein one of said depending elements extends down to a pallet engaging point centrally located below the conveyor track, and wherein the other depending element is in the form of a yoke extending downwardly to transversely spaced pallet engaging points on either side of said conveyor track.

5. Conveying means as set forth in claim 3 wherein one of said depending elements extends down to a pallet engaging point centrally located below the conveyor track, and wherein the other depending element is in the form of a yoke extending downwardly to transversely spaced pallet engaging points on either side of said conveyor track, said central depending element being provided with a pallet supporting member and automatic latching means for engaging said pallet when moved along the floor to a loading position.

6. Conveying means as set forth in claim 3 wherein one of said depending elements extends down to a pallet engaging point centrally located below the conveyor track, and wherein the other depending element is in the form of a yoke extending downwardly to transversely spaced pallet engaging points on either side of said conveyor track, said central depending element being provided with a pallet supporting member and automatic latching means for engaging said pallet when moved along the floor to a loading position, said second depending element being pivotally connected along a transverse axis to said first longitudinally extending member and being provided at either lower end with a pallet supporting member adapted to be swung under the end of said pallet when moved to a loading position, connecting means being provided to lock said latter supporting elements in supporting position under the end of said pallet.

References Cited in the file of this patent

UNITED STATES PATENTS

| | | |
|---|---|---|
| 1,417,528 | Irish et al. | May 30, 1922 |
| 1,769,134 | Haff | July 1, 1930 |
| 2,527,922 | Falkner | Oct. 31, 1950 |